United States Patent [19]
Isaman

[11] Patent Number: 6,035,391
[45] Date of Patent: Mar. 7, 2000

[54] FLOATING POINT OPERATION SYSTEM WHICH DETERMINES AN EXCHANGE INSTRUCTION AND UPDATES A REFERENCE TABLE WHICH MAPS LOGICAL REGISTERS TO PHYSICAL REGISTERS

[75] Inventor: David L. Isaman, San Diego, Calif.

[73] Assignee: STMicroelectronics, Inc., Carrollton, Tex.

[21] Appl. No.: 09/255,353

[22] Filed: Feb. 23, 1999

Related U.S. Application Data

[63] Continuation of application No. 08/775,583, Dec. 31, 1996, abandoned.

[51] Int. Cl.$^7$ ................................................. G06F 9/302
[52] U.S. Cl. ........................... 712/222; 712/221; 712/226; 712/228; 712/235
[58] Field of Search ................................. 712/221, 222, 712/226, 228, 235

[56] References Cited

U.S. PATENT DOCUMENTS

| | | | |
|---|---|---|---|
| 5,367,650 | 11/1994 | Sharangpani et al. | 711/221 |
| 5,487,156 | 1/1996 | Popescu et al. | 712/217 |
| 5,499,352 | 3/1996 | Clift et al. | 712/217 |
| 5,524,262 | 6/1996 | Colwell et al. | 712/23 |
| 5,551,004 | 8/1996 | McClure | 711/138 |
| 5,613,132 | 3/1997 | Clift et al. | 712/217 |
| 5,625,787 | 4/1997 | Mahin et al. | 712/204 |
| 5,634,118 | 5/1997 | Blomgren | 712/226 |
| 5,696,955 | 12/1997 | Goddard et al. | 712/222 |
| 5,717,881 | 2/1998 | Beard et al. | 712/205 |
| 5,727,176 | 3/1998 | Clift et al. | 712/217 |
| 5,826,094 | 10/1998 | Colwell et al. | 712/23 |

OTHER PUBLICATIONS

"The Metaflow Architecture", Popescu et al., IEEE Micro, pp. 10–13 & 63–73 Jun. 1991.

*Primary Examiner*—Meng-Ai T. An
*Assistant Examiner*—Nabil El-Hady
*Attorney, Agent, or Firm*—Theodore E. Galanthay; Lisa K. Jorgenson; Jeffrey D. Moy

[57] ABSTRACT

A system for processing a floating point instruction includes a stack, virtual registers, a stack pointer pointing to one of the virtual registers as top of stack, physical registers, and a reference table mapping the virtual registers to the physical registers, entries of the reference table pointing to physical register locations. An instruction unit generates a plurality of instructions, and a decode unit having a plurality of decoders receives the plurality of instructions from the instruction unit, respectively. The decode unit decodes the plurality of instructions and determines whether any one of the instructions contains a floating point instruction including a floating point exchange instruction. A logic unit is coupled to the reference table and includes a plurality of logic devices coupled to the plurality of decoders in the decode unit, respectively. The logic unit generates an updated table and maintains contents of the physical registers for each floating point exchange instruction received from the decode unit. A control unit receives the updated table from the logic unit and updates the reference table with the updated table.

24 Claims, 13 Drawing Sheets

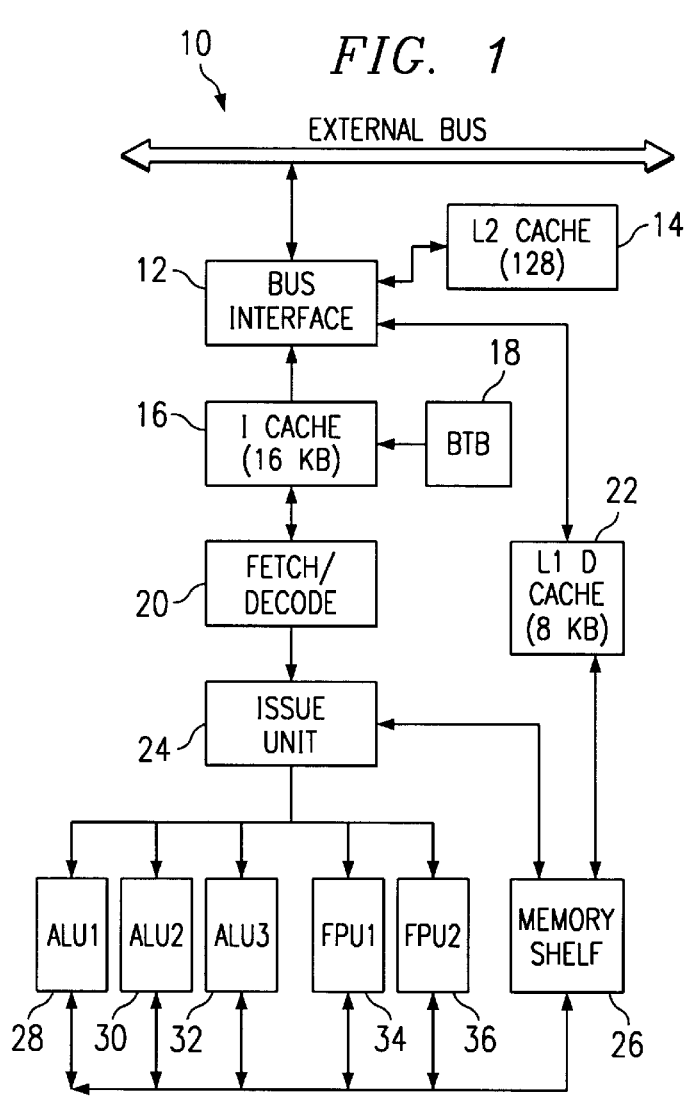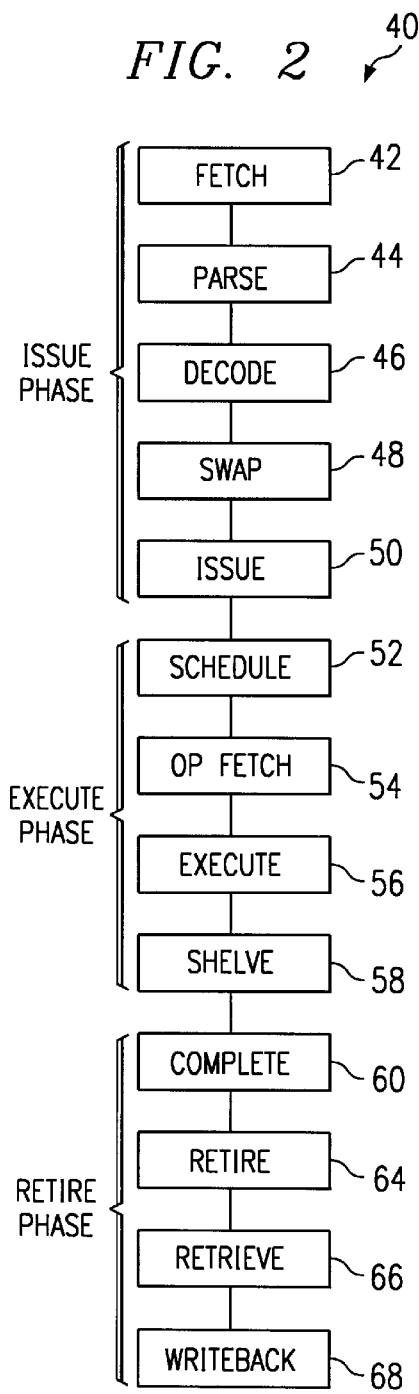

INITIAL STATE OF REGISTERS

ALTERED STATE OF REGISTERS AFTER FOLLOWING INSTRUCTION:
FXCH ST(0), ST(3)

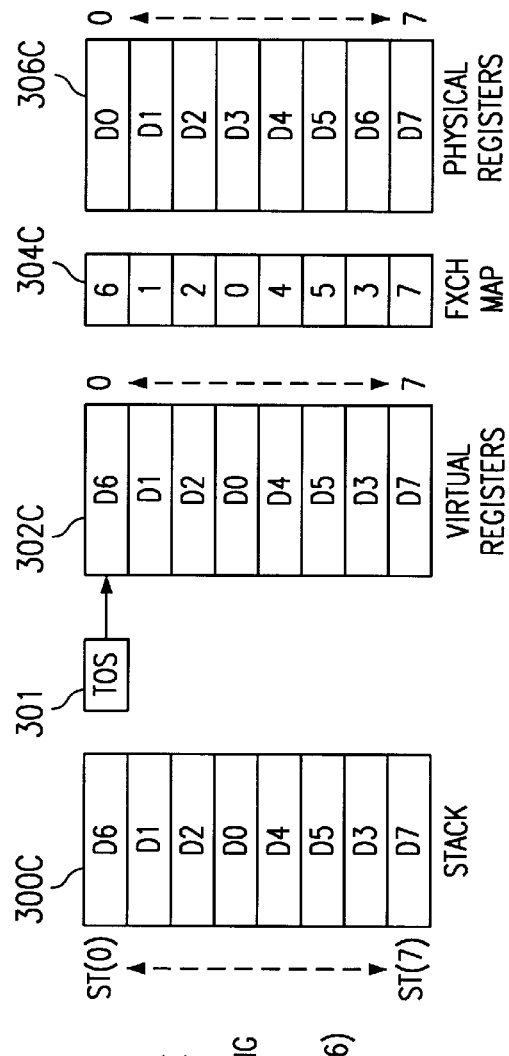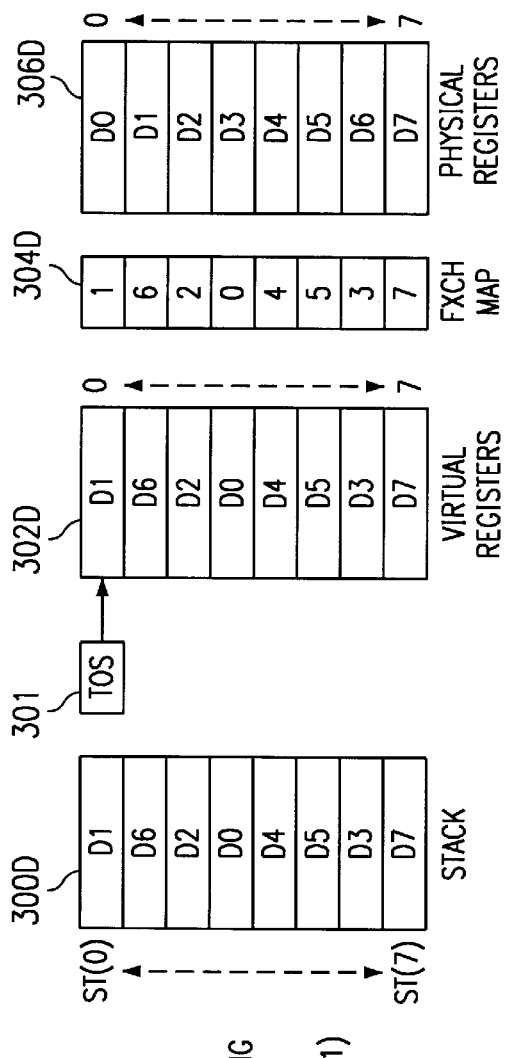

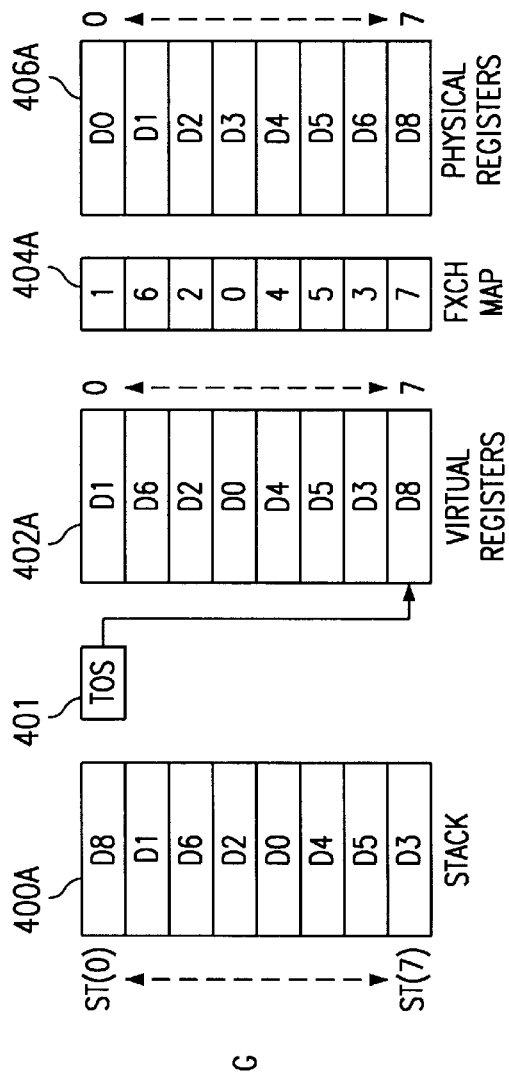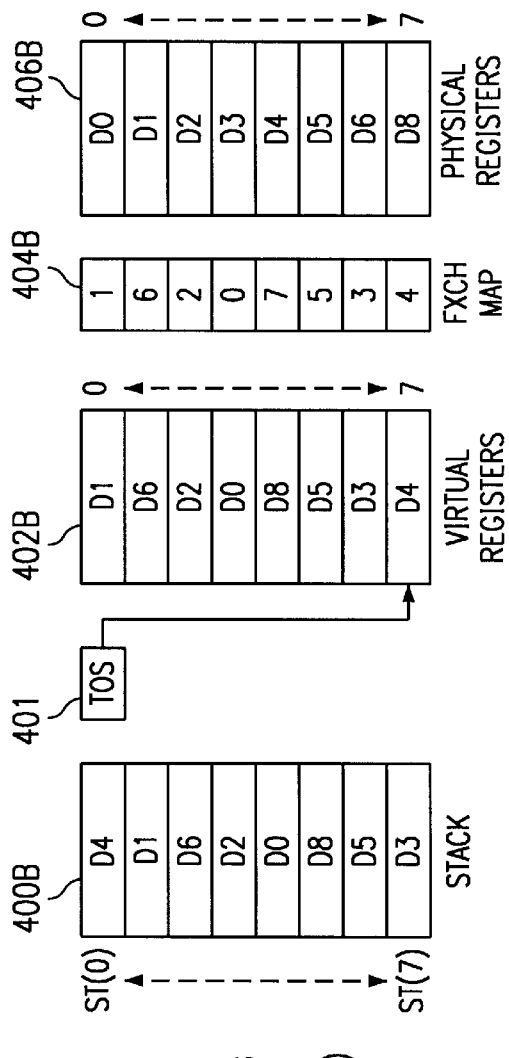
FIG. 7A
ALTERED STATE OF REGISTERS AFTER FOLLOWING INSTRUCTION:
PUSH D8
FIG. 7B
ALTERED STATE OF REGISTERS AFTER FOLLOWING INSTRUCTION:
FXCH ST(0), ST(5)

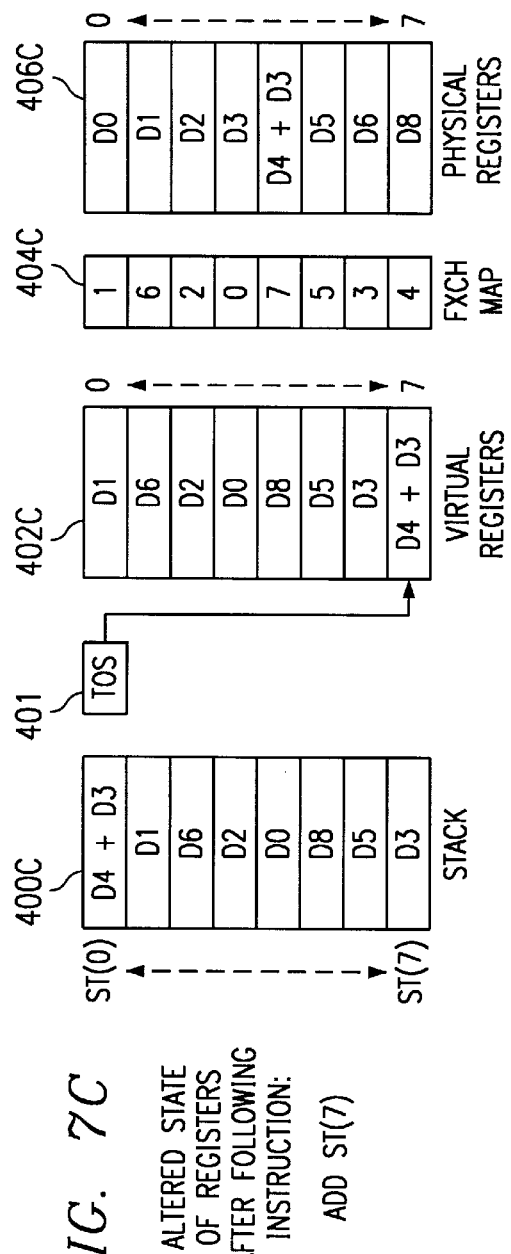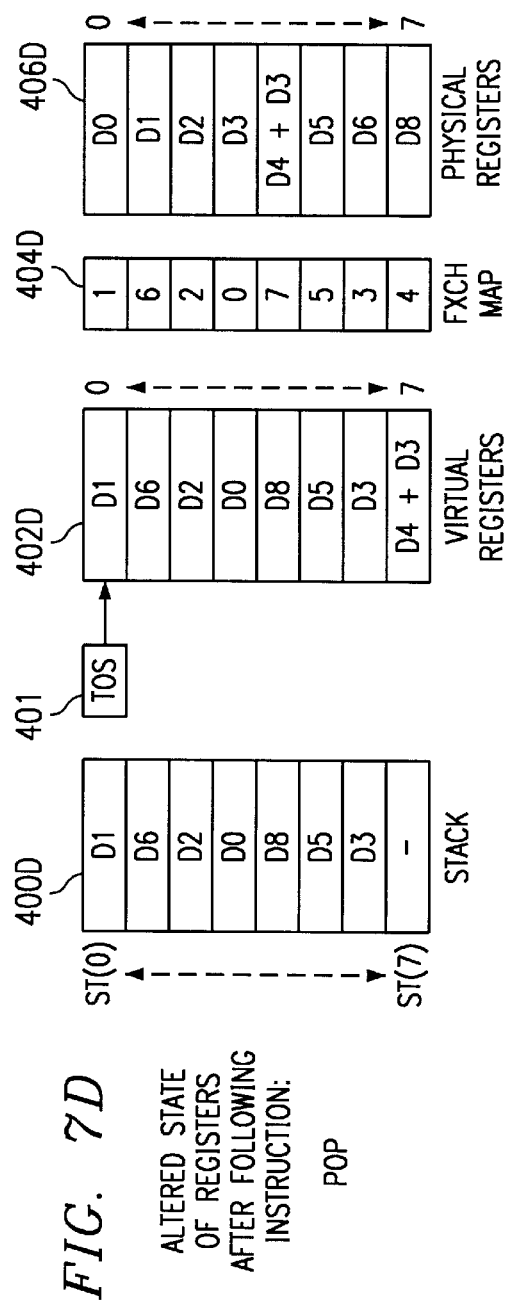
FIG. 7C
ALTERED STATE OF REGISTERS AFTER FOLLOWING INSTRUCTION:
ADD ST(7)
FIG. 7D
ALTERED STATE OF REGISTERS AFTER FOLLOWING INSTRUCTION:
POP

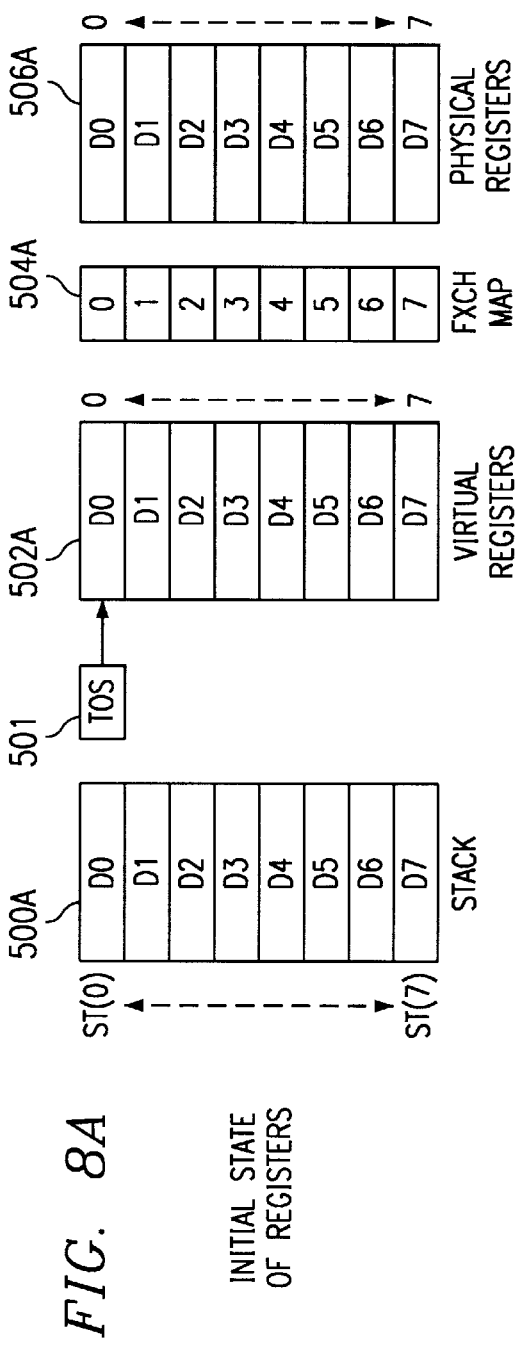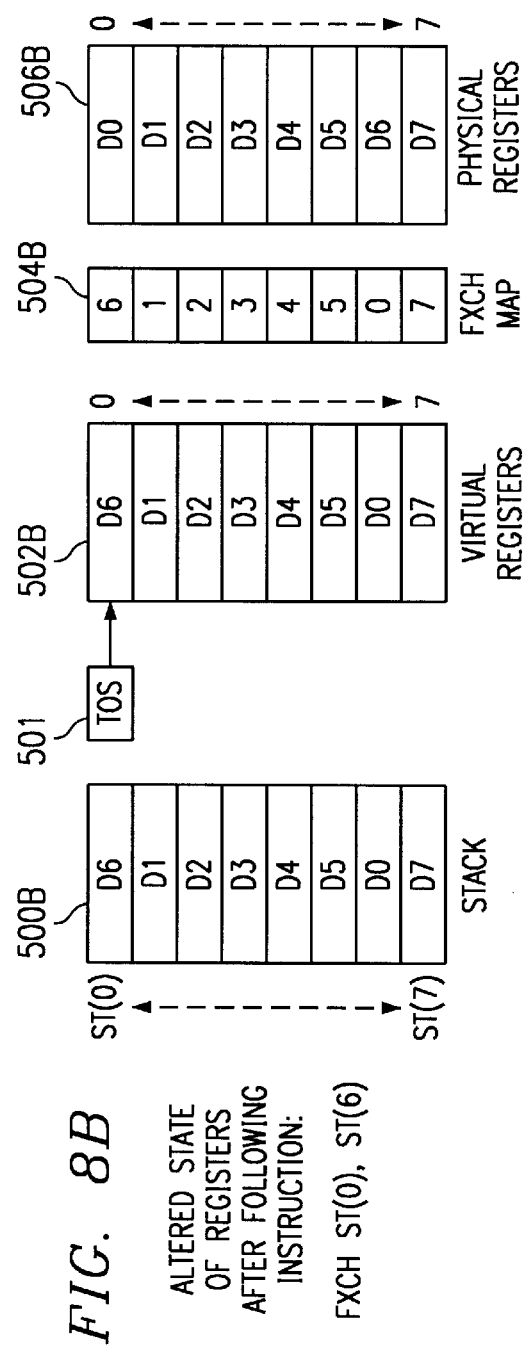

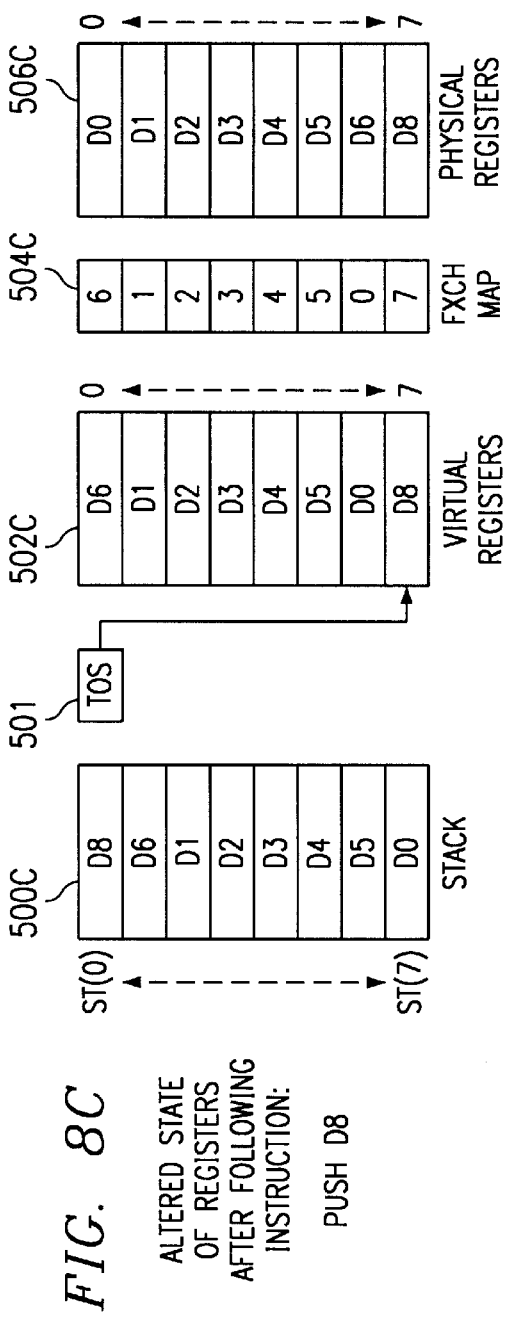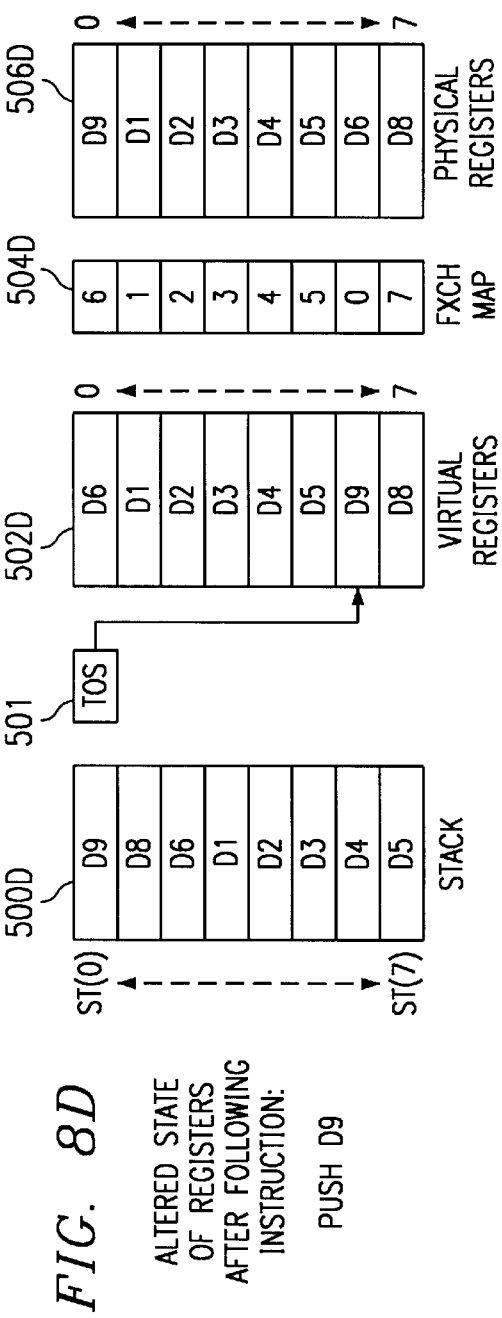

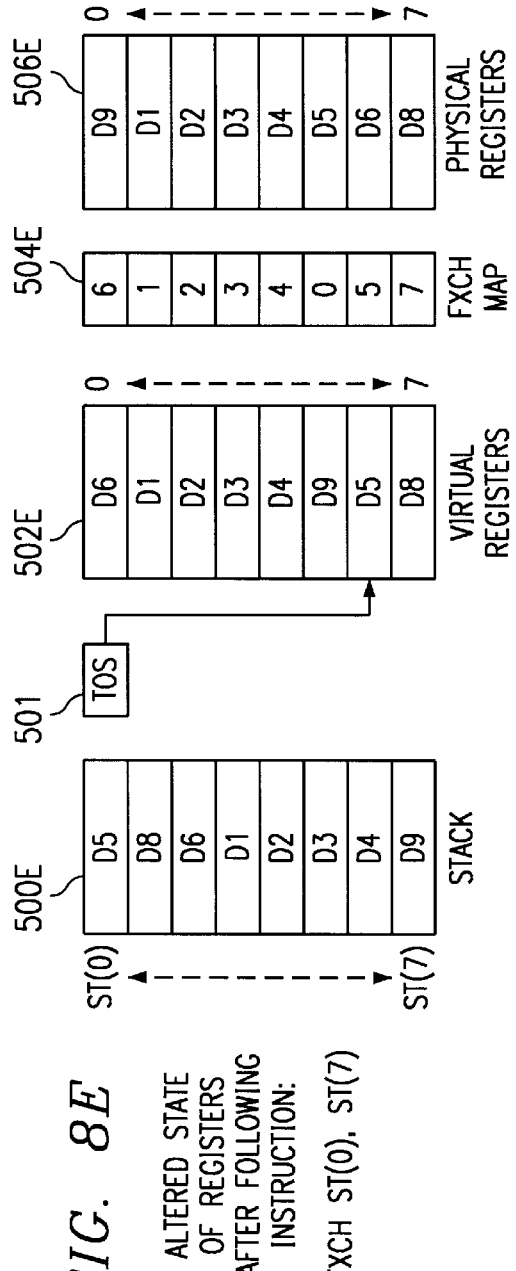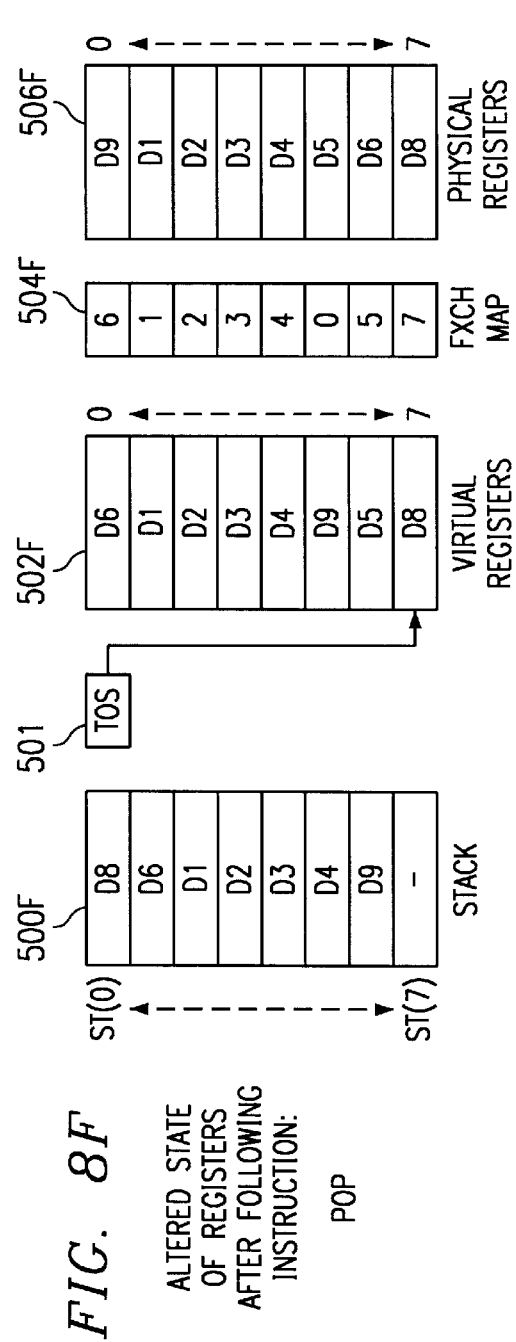

ALTERED STATE OF REGISTERS AFTER FOLLOWING INSTRUCTION:

ADD ST(2)

ALTERED STATE OF REGISTERS AFTER FOLLOWING INSTRUCTION:

FXCH ST(0), ST(6)

FLOATING POINT OPERATION SYSTEM WHICH DETERMINES AN EXCHANGE INSTRUCTION AND UPDATES A REFERENCE TABLE WHICH MAPS LOGICAL REGISTERS TO PHYSICAL REGISTERS

This application is a continuation of U.S. application "FLOATING POINT OPERATION SYSTEM", Ser. No. 0/775,583 filed on Dec. 31, 1996, now abandoned.

BACKGROUND OF THE INVENTION

1. Field of the Invention

The present invention relates to a floating point operation system, and more particularly, to a floating point operation system in a processor. Although the present invention can be used for a wide range of applications including both integer and floating point operations, the invention is especially useful for floating point operations and will be explained with particular attention to them.

2. Discussion of the Related Art

Microprocessors today have taken the math computational ability to the next performance level by using an on-chip floating point unit. Such microprocessors include the x86 family of processors from Intel Corp. Through such features as instruction scheduling and pipelined execution, the floating point unit is capable of executing two floating point instructions in a single clock. For example, incorporated into the unit is a sophisticated eight-stage pipelining. The first four states are similar to integer pipelines while the final four stages consist of a two-stage floating point execute, rounding and writing of the result to the register file, and error reporting. In addition, common floating point functions, such as add, multiply, and divide, are hardwired for faster execution.

One of the features of the inherited x86 architecture, however, is the organization of floating point registers as a stack, which means that direct register references cannot be made. Most accesses therefore must use the top of stack, wherever it is, as an operand. For example, if neither operand is at the top of the stack (TOS), an exchange operation must first be made to place one of the operands at the top of the stack.

The exchange operation presents a problem because unlike most other instructions, the exchange operation reads and writes two registers. To do the exchange, data bits in the physical registers of the stack must be shuffled around. Even for the case where one operand is at the top of the stack, the entire data bits of three registers must be moved—top of stack register, stack register to be exchanged with the top of stack register, and a temporary register. Instead of a temporary register, a technique of writing two locations simultaneously can be used which would require additional wiring between the registers. Thus, even though there is no computation in an exchange operation, two clocks are used to perform the operation. Moreover, a temporary register is also needed to complete the operation. Thus, the conventional technique of executing the exchange operation requires too much time as well as a large number of data lines.

SUMMARY OF THE INVENTION

Accordingly, the present invention is directed to a floating point operation system that substantially obviates one or more of the problems due to limitations and disadvantages of the related art.

An object of the present invention is to provide a floating point operation system that reduces the number of clocks needed and simplifies the floating point exchange operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for processing an instruction including virtual registers, physical registers, and a reference table mapping the virtual registers to the physical registers, comprises an instruction unit generating a plurality of instructions; a decode unit receiving the plurality of instructions from the instruction unit, the decode unit decoding the instruction and determining whether an instruction moves an operand register from one location to another; and a logic unit coupled to the reference table and the decode unit, the logic unit updating the reference table for each exchange instruction received from the decode unit, the physical registers maintaining the same contents for said each exchange instruction.

In another aspect of the present invention, a system for processing a floating point instruction including a stack, virtual registers, a stack pointer pointing to one of the virtual registers as top of stack, physical registers, and a reference table mapping the virtual registers to the physical registers, entries in the reference table pointing to physical register locations, comprises: an instruction unit generating a plurality of instructions; a decode unit receiving the plurality of instructions from the instruction unit, the decode unit decoding the instruction and determining whether an instruction contains a floating point instruction including a floating point exchange instruction; and a logic unit coupled to the reference table and the decode unit, the logic unit updating the reference table for each floating point exchange instruction received from the decode unit, the physical registers maintaining the same contents for said each floating point exchange instruction.

In another aspect of the present invention, a system for processing a floating point instruction including a stack, virtual registers, a stack pointer pointing to one of the virtual registers as top of stack, physical registers, and a reference table mapping the virtual registers to the physical registers, entries in the reference table pointing to physical register locations, comprises: an instruction unit generating a plurality of instructions; a decode unit including a plurality of decoders receiving the plurality of instructions from the instruction unit, respectively, the decode unit decoding the plurality of instructions and determining whether any one of the instructions contains a floating point instruction including a floating point exchange instruction; a logic unit coupled to the reference table and including a plurality of logic devices coupled to the plurality of decoders in the decode unit, respectively, the logic unit generating an updated table for each floating point exchange instruction from the decode unit, the physical registers for said each floating point exchange instruction remaining the same; and a control unit receiving the updated table from the logic unit and updating the reference table with the updated table.

In another aspect of the present invention, a method for processing a floating point instruction using a stack, virtual registers, a stack pointer pointing to one of the virtual registers as top of stack, physical registers, and a reference table mapping the virtual registers to the physical registers, entries in the reference table pointing to physical register locations, comprises the steps of: generating an instruction from an instruction unit; decoding the instruction and determining whether the instruction contains a floating point instruction including a floating point exchange instruction in a decode unit; and updating the reference table and maintaining contents of the physical registers when the instruction is the floating point exchange instruction.

In another aspect of the present invention, a method of processing a floating point instruction using a stack, virtual registers, a stack pointer, physical registers, and a map referencing the virtual registers to the physical registers, entries in the map pointing to physical register locations, comprises the steps of: determining whether an instruction is a floating point exchange instruction; updating the stack, the virtual registers, and the map when the instruction is the floating point exchange instruction while maintaining contents of the physical registers; determining whether the instruction is a push instruction; updating the stack, the stack pointer, the virtual registers, and the physical register when the instruction is the push instruction while maintaining contents of the map; determining whether the instruction is a pop instruction; and updating the stack and the stack pointer when the instruction is the pop instruction while maintaining the contents of the map, the virtual register, and the physical registers; determining whether the instruction is a floating point register instruction when the instruction is not any one of the floating point exchange instruction, push instruction, and the pop instruction; and processing the instruction using the map to reference the physical registers when the instruction is the floating point register instruction.

In another aspect of the present invention, a system for implementing a floating point operation using a stack, virtual registers, a stack pointer, physical registers, and a map referencing the virtual registers to the physical registers, entries in the map pointing to physical register locations, comprises: means for determining whether an instruction is a floating point exchange instruction; and means for updating the stack, the virtual registers, and the map when the instruction is the floating point exchange instruction while maintaining contents of the physical registers; means for determining whether the instruction is a push instruction; means for updating the stack, the stack pointer, the virtual registers, and the physical register when the instruction is the push instruction while maintaining contents of the map; means for determining whether the instruction is a pop instruction; means for updating the stack and the stack pointer when the instruction is the pop instruction while maintaining the contents of the map, the virtual register, and the physical registers; determining whether the instruction is a floating point register instruction when the instruction is not any one of the floating point exchange instruction, push instruction, and the pop instruction; and processing the instruction using the map to reference the physical registers when the instruction is the floating point register instruction.

In another of the present invention, a method for processing a floating point instruction using a stack, virtual registers, a stack pointer pointing to one of the virtual registers as top of stack, physical registers, and a reference table mapping the virtual registers to the physical registers, contents of the reference table having physical register numbers, comprising the steps of: determining whether a reference table error signal occurred; parsing an instruction to generate a parcel when the reference table error signal has not occurred; determining whether the parcel is issued; saving the reference table in a memory at predetermined location when the parcel is issued; determining whether the parcel is a floating point exchange instruction; and updating the reference table and maintaining the physical registers without change when the parcel is the floating point exchange instruction.

In a further aspect of the present invention, a system for processing an instruction including virtual registers, physical registers, and a reference table mapping the virtual registers to the physical registers, comprises: an instruction unit generating a plurality of instructions; a decode unit receiving the plurality of instructions from the instruction unit, the decode unit decoding the instruction and determining whether an instruction moves an operand register from one location to another; and a logic unit coupled to the reference table and the decode unit, the logic unit updating the reference table for each exchange instruction received from the decode unit, the physical registers maintaining the same contents for said each exchange instruction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of a system architecture of a processor used in the present invention;

FIG. 2 shows an instruction flow of floating point operations;

FIGS. 6A–6D illustrate examples of floating operations in accordance with the present invention;

FIGS. 7A–7D illustrate more examples of floating operations in accordance with the present invention;

FIGS. 8A–8H illustrate yet more examples of floating operations in accordance with the present invention;

DETAILED DESCRIPTION OF PREFERRED EMBODIMENTS

Figure 3:
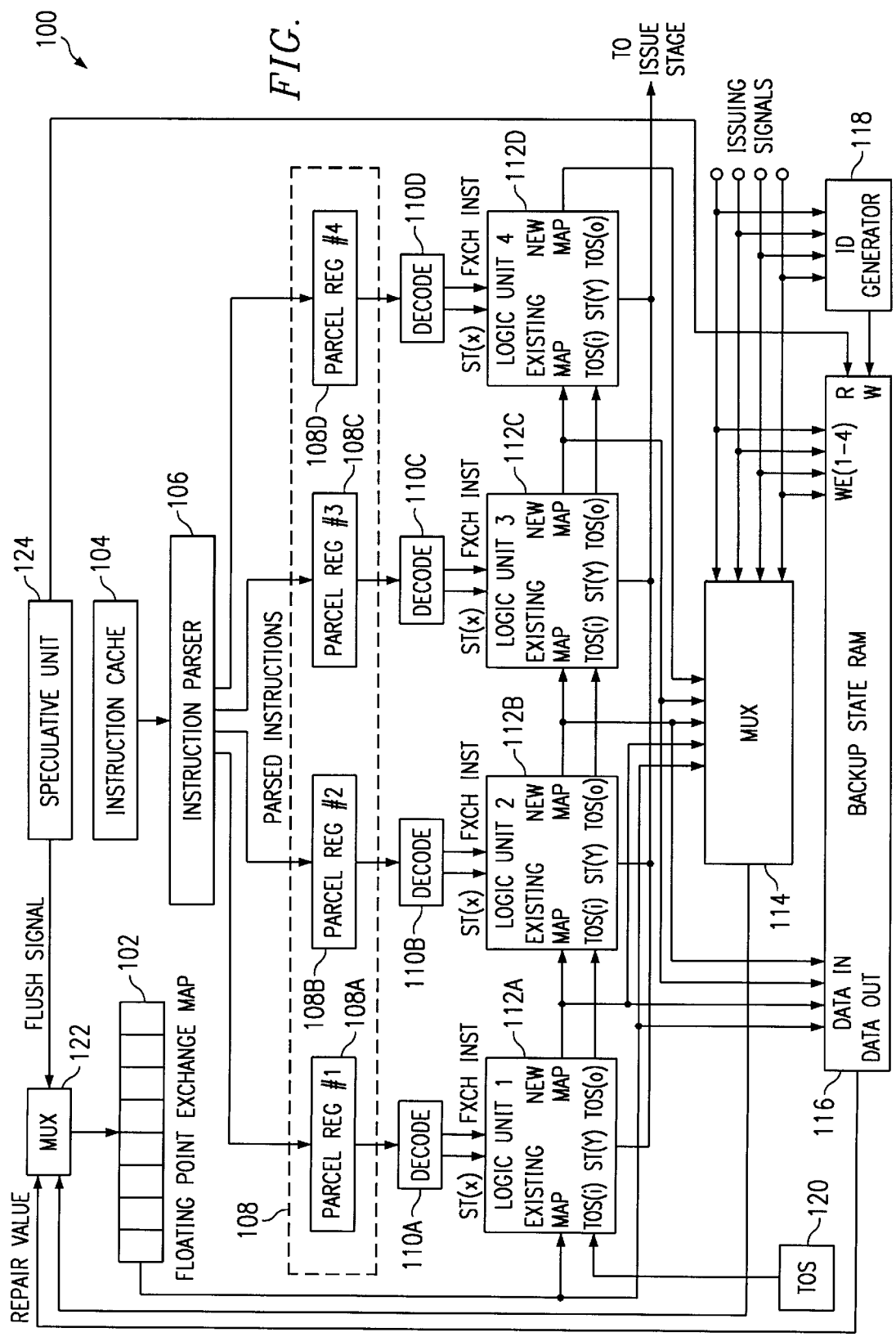
FIG. 3 shows a block diagram of an embodiment of the floating point operation system in accordance with the present invention.

Reference will now be made in detail to the preferred embodiments of the present invention, examples of which are illustrated in the accompanying drawings.

FIG. 1 illustrates a system architecture, as an example, that may be applicable to the present invention. The system architecture of FIG. 1 includes an external bus connected to a bus interface 12 which is connected to both L1 and L2 caches. The L1 cache includes both the instruction cache 16, which is connected to a branch target buffer (BTB) 18, and data cache 22. The instruction cache 16 is connected to fetch/decode unit 20, which is connected to the issue unit 24. The issue unit 24 is connected to the memory shelf 26 and also to arithmetic logic units (ALUs)(28, 30, 32) and floating point units (FPUs) (34,36). The present invention focuses, among others, on the fetch/decode unit 20 and issue unit 24 of the system architecture.

In the present invention, floating point instructions are generally processed in three phases—issue phase, execute phase, and retire phase. A floating point instruction flow including these phases, which are similar to an integer instruction flow, is shown in FIG. 2. The issue phase processes the instructions "in order" and includes fetch 42, parse 44, decode 46, swap 48, and issue 50. The execute phase processes the instructions "out of order" and includes schedule 52, operand fetch 54, execute 56, and shelve 58. The retire phase processes the instruction "in order" again and includes complete 60, retire 64, retrieve 66, writeback 68. The stages of the three phases are processed in a pipeline.

The out-of-order execution scheme as well as other relevant portions of this application are explained in detail in the following three references, the contents of all of which are incorporated by reference in this application: (1) U.S. Pat. No. 5,487,156 to Popescu et al. entitled "PROCESSOR ARCHITECTURE HAVING INDEPENDENTLY FETCHING ISSUING AND UPDATING OPERATIONS OF INSTRUCTIONS WHICH ARE SEQUENTIALLY ASSIGNED AND STORED IN ORDER FETCHED," issued Jan. 23, 1996 (2) "The Metaflow Architecture," by Val Popescu et al., IEEE Micro, June 1991; (3) "Instruction Issue Logic for High-Performance, Interruptible, multiple Functional Unit, Pipelined Computers," by Gurindar S. Sohi, IEEE Transactions On Computers, vol. 39, No. 3, March 1990.

Referring now to FIG. 2, during the instruction fetch stage 42 of the issue phase, a cache line is read from the instruction cache into the instruction fetch buffer. The instruction fetch stage works in conjunction with a branch target cache, which predicts the next fetch address from the instruction cache. The instruction parse stage 44 of the issue phase detects instruction type and its boundaries and passes appropriate instruction bytes to the instruction decode stage. In the instruction decode stage 46, the instruction bytes from the parse stage 44 are fed to four decoders in parallel, for example, in addition to the microcontrol ROM. These decoders translate the x86 instruction bytes, for example, to RISC operations called "parcels." These parcels are then fed to the instruction issue stage. Before the parcels are fed to the instruction issue stage, however, the floating point instruction flow of the present invention includes a swap stage 48 to support the floating point exchange (FXCH) instruction, which swaps the contents of the destination and stack-top registers. The instruction issue stage 50 shelves the instructions in an instruction shelf in parallel with the memory shelf if it is a load/store instruction.

In the schedule stage 52 of the execution phase, the ALU or FPU selects an instruction based on the availability of operands and its age. The oldest instructions with all operands available will be selected first. After an instruction is scheduled for execution, its operands are fetched from either the result shelf or sane register file. The result shelf is a memory structure where results of instructions are stored temporarily before the instruction can be retired. A sane register file is the physical register file which is visible to the programmer. As shown in the example system architecture of FIG. 1, there are five execution units including three ALUs and two FPUs. ALU1 is capable of all arithmetic operations and ALU2 is capable of all arithmetic operations except multiply and divide. ALU3 is used for resolving indirections for memory operations, i.e., it does all the address calculations for memory operations. FPU1 is capable of add, integer to floating point conversion and vice versa, round to integer, subtract and multi-media instructions. FPU2 is capable of divide, square root, multiply and transcendental functions. Hence, up to two floating point instructions can be issued to the floating point unit every clock. The last stage of the execution phase is the shelve stage 58. Although the execution phase is performed out of order, the next phase, retire phase, is performed in order. Thus, in the shelve stage 58, results of the instructions executed out of order which are not committed are stored in a result shelf. The data from the result shelf can be used by dependent instructions.

The retire phase includes four stages—completion, retire, retrieve, and writeback. In the completion phase 60, instruction completion is detected and the retire stage 64 determines the number of instructions to be retired per clock cycle. When an instruction is retired, the results are read from the result shelf in the retrieve stage 66. Then, the results from the result shelf are committed to the programmer visible register file in the writeback stage 68.

The present invention focuses on the issue phase of the above three phases and will be discussed in more detail to explain the floating point operation system of the present invention.

As discussed in the BACKGROUND section above, each time a floating point exchange instruction is executed in a conventional technique, the actual data bits of physical registers are shuffled around, requiring a large number of data lines (wires) and clocks. To overcome this problem, the present invention uses a floating point exchange (FXCH) map to point to the location of the physical registers. Thus, instead of moving a large number of data bits, only the FXCH map is shuffled, which requires significantly less number of clocks and wires. An example is shown in FIGS. 6A–6D.

Figure 9A:
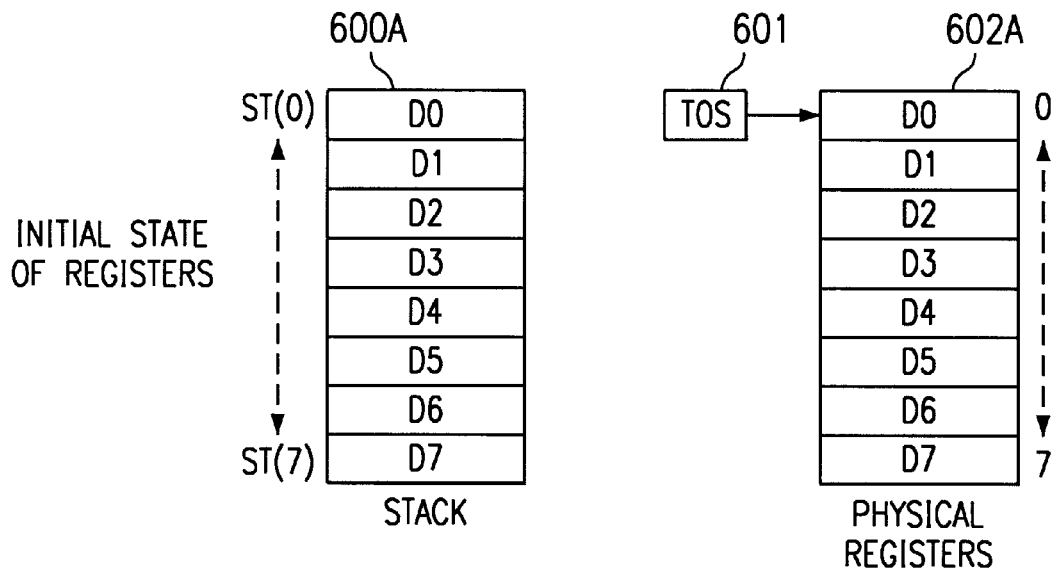
FIGS. 9A and 9B illustrate examples of conventional floating point operations.

FIGS. 6A–6D show a stack with eight entries, virtual registers having eight entries each showing data, a register file having physical registers with eight data storage locations addressed by numbers 0 to 7, and an FXCH map having eight entries each having three bit data representing physical register numbers. A stack pointer points to one of the virtual registers as the top of stack (TOS). The stack and virtual registers are not physical registers and merely show different ways of ordering the data in the physical registers. Actual physical data are stored only in FXCH map and the physical registers. FXCH map stores three bit data to represent the eight registers of the physical registers. The physical registers, which may store greater than 80 bits of data per register, may be any suitable storage device such as registers, memory, etc. A conventional technique only has the stack, physical registers, and a stack pointer that points to one of the physical registers as the top of stack (TOS), as shown in FIGS. 9A and 9B.

Figure 6A:
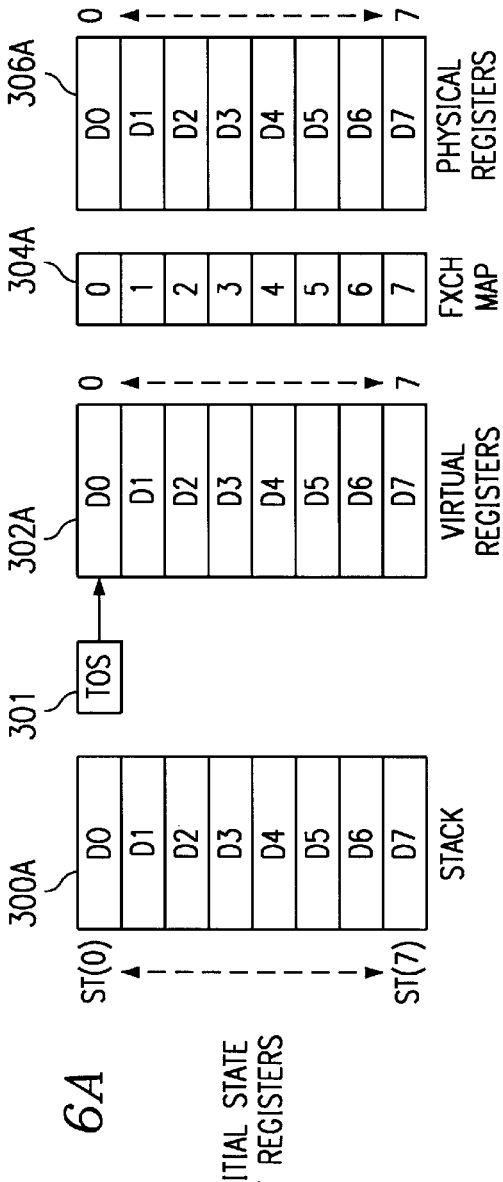

Referring to FIG. 6A, which shows an initial state of the registers, eight stack elements (300A) are shown at the left, ST(0) to ST(7), with data entries D0 to D7, respectively. Eight virtual registers 302A are shown with data entries D0 to D7, respectively. The top of stack (TOS) 301 points to one of the virtual registers. Here, TOS 301 points to virtual register "0" initially. Eight physical registers 306A are shown with data entries D0 to D7. The FXCH map 304A is shown between the virtual registers 302A and the physical registers 306A. The FXCH map 304A contains eight entries 0–7, which map the virtual registers to physical register locations. Thus, initially, we assume the above-identified entries.

Figure 6B:
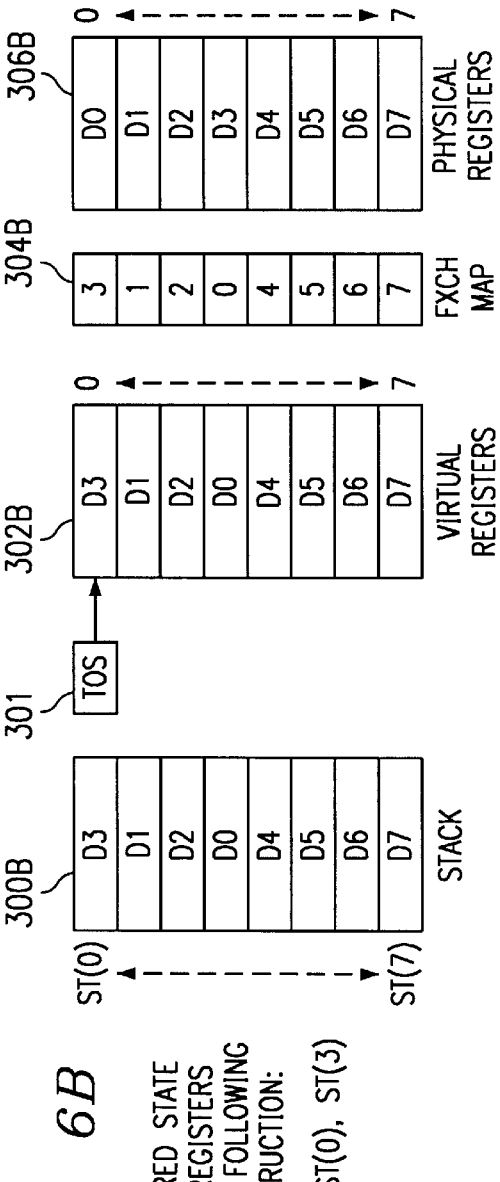

When a floating exchange instruction is executed to exchange or swap ST(0) and ST(3), for example, the registers will be altered as shown in FIG. 6B in accordance with the present invention. In particular, D3 and D0 will be swapped in the stack 300B as well as in the virtual registers 302B. Thus, the top of stack 301 still points to virtual register "0" which now contains D3. The FXCH map 304B is updated by placing physical register location "3" at FXCH map entry number 0 and placing physical register location "0" at FXCH map entry number 3. The contents of the physical registers 306B remain the same. Thus, although the stack 300B, virtual registers 302B, and the FXCH map have changed, the physical registers 306B remain the same. Thus, after this instruction, to retrieve the content of the top of stack, the FXCH map is first looked at to determine which physical register should be accessed. In this instance, the TOS 301 points to virtual register "0" which contains D3 and the corresponding entry "0" of FXCH map points to physical register "3" as having D3.

Figure 9B:
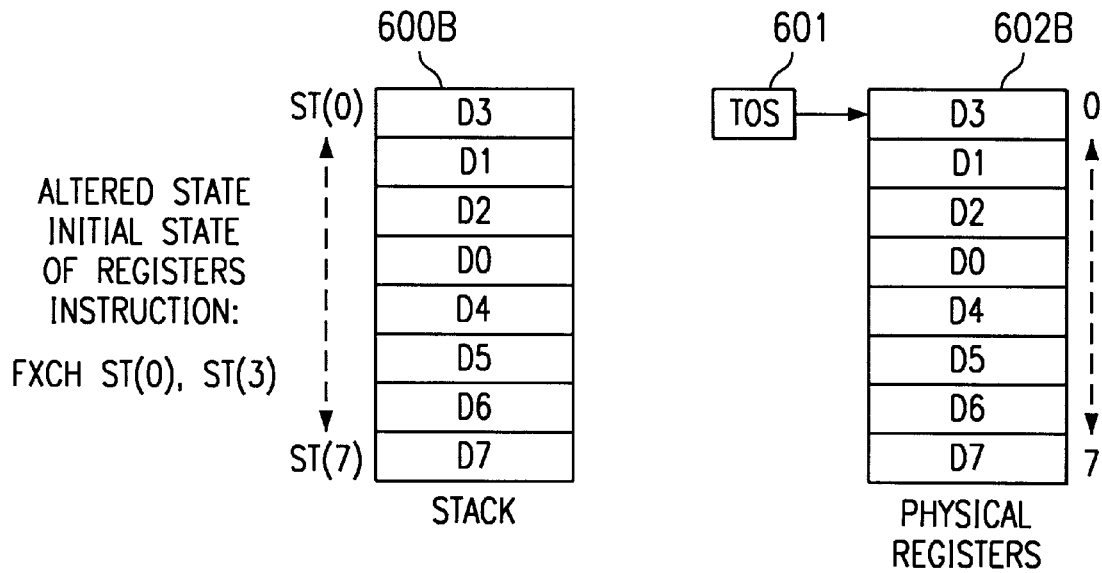

Compare the example of the present invention in FIG. 6B to an example in the conventional technique shown in FIG. 9B. Both FIGS. 6B and 9B show results from the same floating point exchange instruction starting from the same initial state (FIGS. 6A and 9A). Here, the order of data in the physical registers 602B of FIG. 9B is identical to the order of data in the virtual register 302B of FIG. 6B and the stack pointer of bothexamples points to the same register number. The difference, however, is that the virtual registers of the present invention are not real registers; they are merely a way to view the data in the physical registers, which have not changed in the present invention. The only physical data that have changed in the present invention are the ones in the FXCH map which contain only three bits per entry as opposed to more than 80 bits per register in the physical registers. The advantage of the present invention is clear in that only three bits are moved instead of more than 80 bits.

FIG. 6C illustrates another floating point exchange instruction. This time, ST(0) is exchanged with ST(6). Thus, continuing from the register states shown in FIG. 6B, stack 300C in FIG. 6C is changed so that ST(0) contains D6 and ST(6) contains D3. Other stack entries remain the same as in FIG. 6B. The virtual registers 302C are changed identically to stack 300C with the TOS 301 pointing to virtual register "0" having D6 as its content. The FXCH map 304C is again updated. This time, the 0th position (entry number 0) of the FXCH map is updated to point to physical register location 6 and the 6th position of the FXCH map is updated to point to physical register location 3. Again, the physical registers remain the same.

FIG. 6D shows yet another example of a floating point exchange instruction. This time, ST(0) is exchanged with ST(1). Following the same steps as the above two FXCH examples, changes in the stack 300D, virtual registers 302D, and FXCH map 304D are shown in FIG. 6D.

Thus, as shown in the examples in FIGS. 6A–6D, the only physical data movement occurs in the FXCH map which only has three bits per entry, in this instance, as opposed to moving greater than 80 bits per register (requiring movement of more than 160 bits since an exchange requires at least two physical registers or three if a temporary register is used). Additional examples will be discussed later.

Now, the implementation of the present invention will be explained in detail.

FIG. 3 shows a block diagram of an embodiment of the present invention. Referring to FIG. 3, an instruction parser 106 retrieves one or more instructions from the instruction cache 104. The instruction parser 106 separates the instructions into four individual RISC operations (RISC OPS) called "parcels." The four parcels are stored in parcel registers (108A, 108B, 108C, 108D). Each parcel register sends its parcel to a corresponding decoder (110A, 110B, 110C, 110D) where the parcel is decoded to determine whether the parcel contains a floating point exchange instruction and also determine the operand registers. The decoded instruction is then sent to corresponding logic units (112A, 112B, 112C, 112D).

The logic units also receive the top of stack information and the current or existing FXCH map, which is updated each time a floating point exchange instruction is processed. The FXCH map is used as a look-up-table each time an instruction requires the use of a floating point register since the FXCH map holds the key to where the physical data is, as discussed in the examples above. If a logic unit has received an FXCH instruction, then the logic unit simply updates the FXCH map and the physical registers are not changed. Each updated FXCH map is sent to the next logic unit for processing the next parcel. It should be noted here that up to four parcels from the parcel registers 1–4 may be processed in sequence starting from logic unit 1 (112A) to logic unit 4 (112D) all in one clock. The logic units (112A, 112B, 112C, 112D) also obtain the correct operand, ST(Y), for those instructions having floating point registers by using the floating point exchange map. The operand is sent to the next stage which is the issue stage, as shown in FIG. 3.

The updated FXCH map or "new map" from each of the logic units and the current FXCH map prior to logic unit 1 (112A) are input to a multiplexer 114. The multiplexer 114 outputs the new map of the logic unit that processed the last parcel issued in accordance with the issuing signals acting as selectors of the multiplexer 114. For example, if no parcel is issued, then the "old map" (existing map of logic unit 1) is selected, if only one parcel is issued, then the new map of logic unit 1 is selected, if two parcels are issued, then the new map of logic unit 2 is selected, and so on. Note that if two parcels are issued, for example, and logic unit 1 processed a floating point exchange instruction but logic unit 2 did not, the new map of logic unit 2 is still selected in the multiplexer 114 since the new map of logic unit 2 in this case is identical to the new map of logic unit 1, i.e., the FXCH map did not change from existing map to new map in logic unit 2. Thus, if no logic unit received a floating point exchange instruction, the "old" map (prior to logic unit 1) is output from each of the four logic units and is output from the multiplexer regardless of which parcel or parcels are issued. Once the multiplexer 114 selects the new map, it is output to the floating point exchange FXCH map register 102 and physically updated through another multiplexer 122, which selects between the output (new map) of multiplexer 114 and the output (repair value) of a backup state RAM 116 according to a "flush signal" from a speculative unit 124.

The backup state RAM 116 receives the existing.FXCH map inputs from each of the four logic units (112A, 112B, 112C, 112D). These are saved in the RAM 116 according to the number of instructions (parcels) that are issued similar to as discussed above with reference to multiplexer 114. Here, the issuing signals also act as write enable signals for the backup state RAM 116 so that depending on which parcel or parcels are issued, the corresponding existing map or existing maps from the logic units are saved. The reason for saving the existing maps in the backup state RAM is because of what is called "speculative execution" which is discussed in detail, for example, in U.S. Pat. No. 5,487,156 and the "The Metaflow Architecture" paper, both discussed above and the contents of which are incorporated by reference.

In speculative execution, stalls due to control dependencies, such as conditional branch instructions, are avoided as much as possible to make available a steady supply of candidate instructions so that the pipeline is kept full. To do this, branches are predicted by the BTB 18 (see FIG. 1) and instructions after a branch are processed before the actual branch has taken place to maintain the steady pool of candidate instructions. Otherwise, the process would stall until the branch instruction is processed, wasting valuable time. An issue with branch prediction, however, is the situation where the branch prediction is incorrect. Then, the instructions processed after the wrong branch become unusable. To remedy this situation, the backup state RAM stores existing maps from the logic units, each existing map corresponding to the identification (ID) of the parcel to which the map is applicable.

The remedy to overcome errors from speculative execution is preferably implemented in the present invention by sending a read address (R) from the speculative unit 124 to the backup state RAM 116 and sending a write address (W) from an ID generator 118. The ID generator generates a unique ID for each parcel. Here, the ID generator 118 also receives the issuing signals and outputs a write address to the backup state RAM 116, which is a reference address where the new maps are written consecutively starting from that address. The ID generator is also discussed in detail in U.S. Pat. No. 5,487,156 and the "The Metaflow Architecture" paper, for example.

Thus, if an error is detected in the speculative unit 124, a read address is sent to the backup state RAM 116 to locate the last valid FXCH map or "repair value" and a flush signal is sent to multiplexer 122. The backup state RAM 116 outputs the repair value to the multiplexer 122 which outputs the repair value to the floating point exchange map register 102.

The operation of the embodiment in FIG. 3 is explained with reference to flowcharts in FIGS. 4A and 4B.

Figures 4A, 4B:
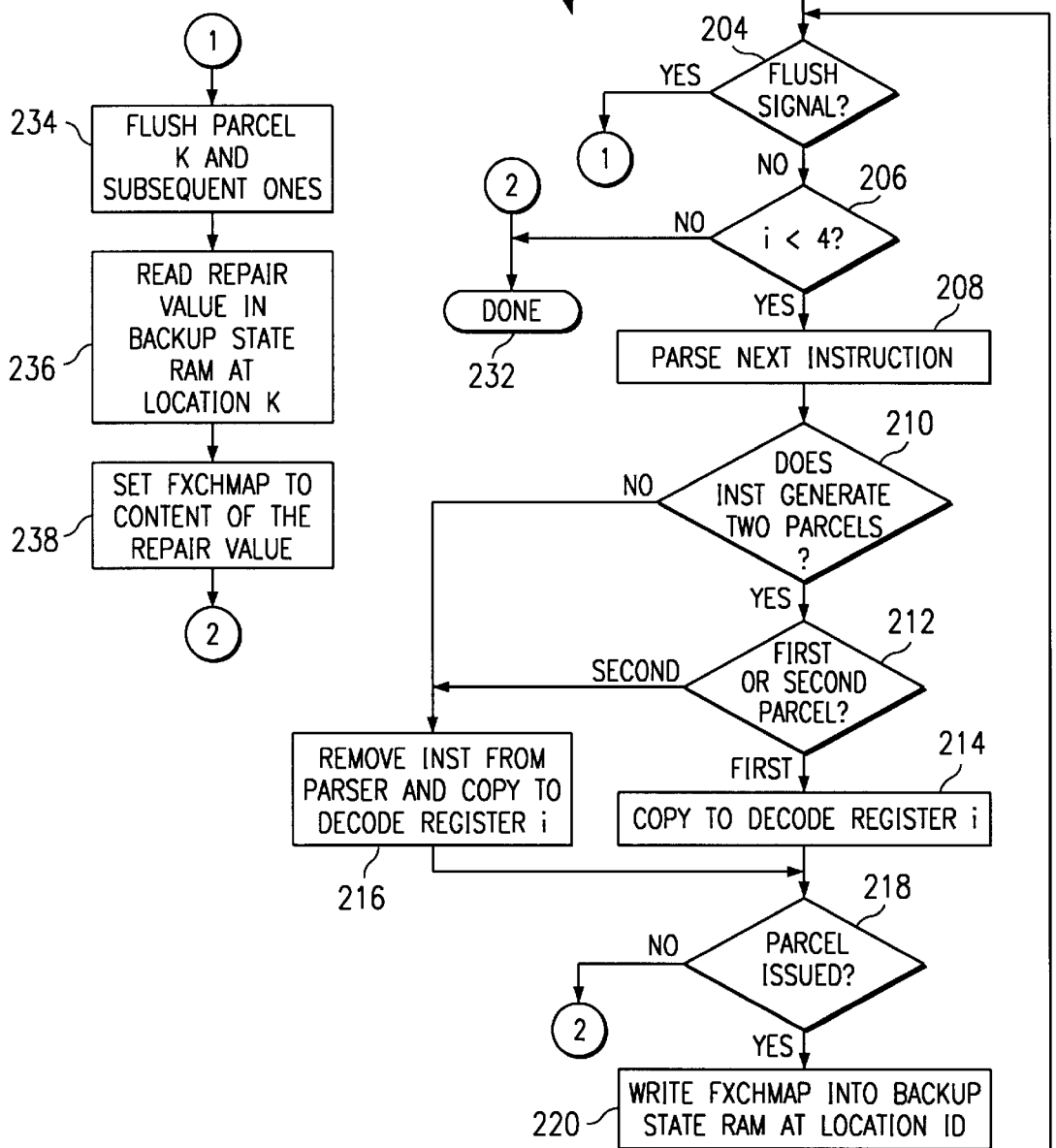
FIGS. 4A and 4B are flowcharts illustrating the floating point operation system in accordance with the present invention.

Referring to FIG. 4A, after an initialization step 202, it is determined whether a flush signal is received at step 204. If a flush signal is not received, then the next instruction is parsed in step 208. Note that step 206 accounts for up to four parcels in one clock. Step 210 determines whether the instruction in question is an instruction that will generate two parcels. For example, when an instruction has as operands one reference to a memory location and one to a register, then the same instruction is copied to two parcel registers. One copy handles the load from the memory and the second copy operates on the loaded value and the register. Thus, if the instruction is not the kind that will generate two parcels, then, the instruction is removed from the parser and copied to decode register i (depending on the ith iteration) (steps 210 and 216). If, however, the instruction will generate two parcels, then for the first parcel, the instruction is copied to the decode register i without removing it from the parser (steps 210, 212, and 214). For the second parcel, the instruction is removed from the parser and copied to decode register i (step 210, 212, and 216).

Once the instruction has been copied to the appropriate register, it is determined whether a parcel or parcels have been issued at step 218. If not, the process is done (step 232). If at least one parcel is issued, then the existing map input to the corresponding logic unit is written into the backup state RAM at location ID (steps 218 and 220).

If the parcel in question is an exchange instruction to exchange two registers and preferably, a floating point exchange instruction to exchange the top of stack, ST(0), with ST(j), then the FXCH map is updated accordingly (steps 222 and 224). If the parcel in question is not a floating point exchange instruction, then the FXCH map is not updated. Nevertheless, if the parcel in question has a floating point register, then the FXCH map is used to determine the appropriate physical register number of each operand (steps 226 and 228). After each of steps 224 and 228, the next parcel is retrieved using the next ID (step 230).

If in step 204 a flush signal occurred, then parcel K (which is the first parcel resulting from an error in the speculative unit) and subsequent parcels are flushed or discarded (step 234 in FIG. 4B). Then, the repair value is read from the backup state RAM at location K to set the FXCH map to the content of the repair value, i.e., the contents of the FXCH map before the error occurred. (steps 236 and 238).

Figure 5:
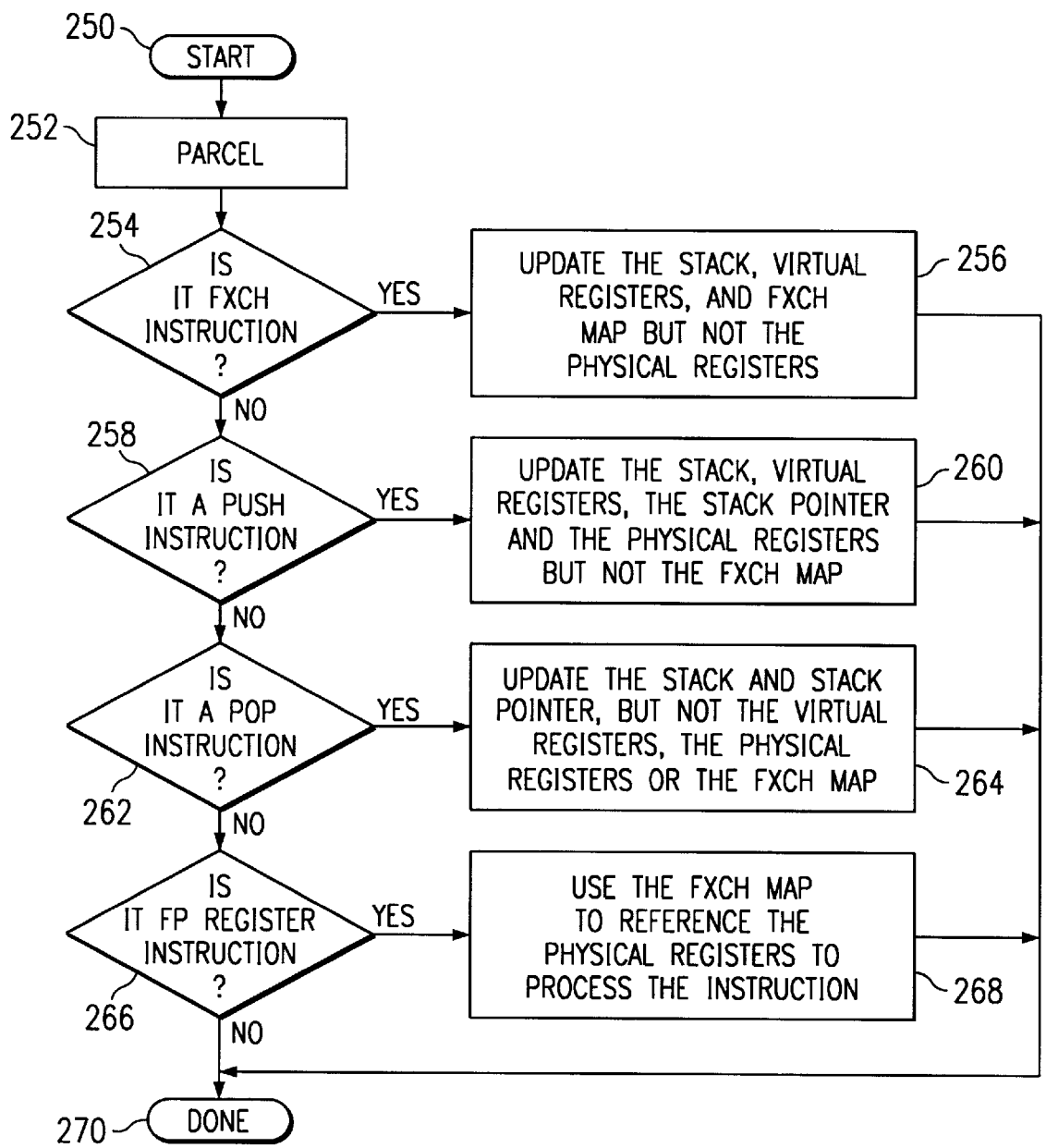
FIG. 5 is another flowchart illustrating the floating point operation system in accordance with the present invention.

Before considering additional sample instructions, another process for updating registers in a floating point instruction is explained with reference to FIG. 5. FIG. 5 shows a flowchart for handling different types of instructions including, FXCH, PUSH and POP instructions. Here, the flowchart of FIG. 5 may replace steps 222, 224, 226 and 228 of FIG. 4A. Thus, step 220 of FIG. 4A would be connected to step 252 and step 270 of FIG. 5 would be connected to step 230 of FIG. 4A.

Considering only floating point instructions, if the instruction in question is an FXCH instruction, then the stack, the virtual registers, and the FXCH map are updated but the physical registers remain intact (see, for example, FIGS. 6B–6D, 7B, 8B, 8E, and 8H) (steps 250, 252, 254, and 256). If the instruction in question is a PUSH instruction, then the stack, the virtual registers, the stack pointer, and the physical registers are updated but the FXCH map remains intact (see, for example, FIGS. 7A, 8C, and 8D) (steps 258 and 260). If the instruction in question is a POP instruction, then the stack and the stack pointer are updated but the virtual registers, the physical registers and the FXCH map remain intact (see, for example, FIGS. 7D and 8F) (steps 262 and 264). If the instruction in question is none of the above but it does contain a floating point register, then the FXCH map is used to get the operand from the correct physical register (see, for example, FIGS. 7C and 8G) (step 266 and 268).

Now, several more sample instructions will be considered in accordance with the present invention.

FIGS. 7A–7D illustrate PUSH, FXCH, ADD, and POP instructions and continues from the register states shown in FIG. 6D. Starting from the register states of FIG. 6D, FIG. 7A shows the updated registers for a PUSH instruction to insert D8 to the top of stack. The stack 400A removes D7 from ST(7) to make room for D8. The stack pointer has decremented and now points to virtual register "7" which contains D8. The FXCH map 404A has not changed but the physical register "7" has been overwritten to D8. FIG. 7B shows the updated registers for an FXCH instruction to exchange the top of stack, ST(0), with ST(5). This instruction swaps contents of ST(0) and ST(5), as reflected in stack 400B. In the virtual registers 402B, contents of virtual register "7" (TOS) and virtual register "4" (ST(5)) have been swapped. The FXCH map 404B has also been updated so that entries 4 and 7 have been swapped to map virtual register "7" to physical register "4" and virtual register "4" to physical register "7" while maintaining the physical registers 406B without change. Next, FIG. 7C illustrates an ADD to add content of top of stack, ST(0), with content of ST(7). The content of ST(0) has changed in the stack 400C to (D4+D3) and the content of virtual register "7" (TOS) has also changed to (D4+D3). The FXCH map 404C did not change but the physical register "4" has changed to reflect the addition. FIG. 7D shows a POP instruction to remove the addition result from the ADD operation in FIG. 7C. Here, stack 400D shows that an empty slot has been created at ST(7) due to the removal of (D4+D3) from TOS. The stack pointer (TOS) has been incremented by one from virtual register "7" to virtual register "0" but the virtual registers 402D have not changed. The POP instruction did not change the FXCH map 404D or the physical registers 406D.

Thus, in the examples of FIGS. 7A–7D, the only instructions that changed the physical registers are PUSH and ADD instructions in FIGS. 7A and 7C. Neither the FXCH nor POP instruction has changed the physical registers.

Figure 8G:
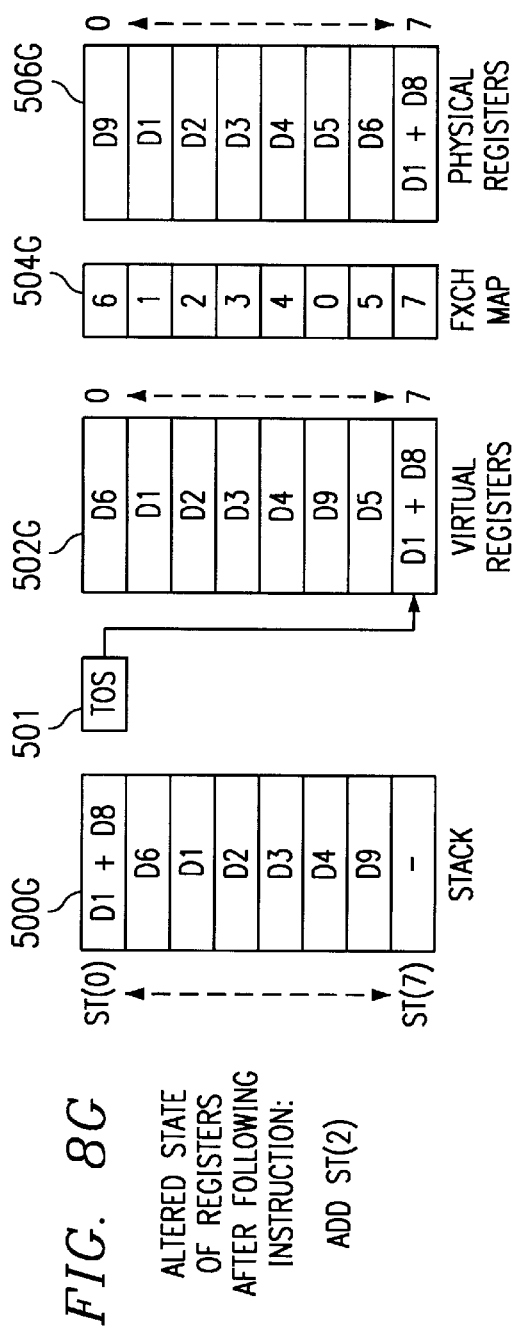

FIGS. 8A–8H illustrate more diverse samples including POP and ADD instructions. FIG. 8A illustrates the initial state similar to FIGS. 6A and 7A. FIG. 8B illustrates another FXCH instruction to exchange ST(0) with ST(6). Thus, the stack 500B, the virtual registers 502B, and the FXCH map 504B are updated accordingly. FIGS. 8C and 8D illustrate PUSH instructions similar to FIGS. 7C and 7D and the results are shown accordingly. Now, FIG. 8E shows an FXCH instruction (after the PUSH instruction of FIG. 8D) to exchange ST(0) with ST(7). Here, since the TOS 501 is at virtual register "6," ST(7) is located in virtual register "5." Thus, D5 and D9 in the virtual register of FIG. 8D is swapped in FIG. 8E. Also, the FXCH map 504 is changed by swapping 5 and 0.

FIG. 8F illustrates a POP instruction, continuing on from led the sample in FIG. 8E. In the stack, the POP instruction removes the data at the top of the stack and an empty slot is created. In the virtual register, the stack pointer increments by one to point to virtual register "7" from "6" but the entry D5 is not removed. Also, the FXCH map 504F and the physical registers 506F do not change.

FIG. 8G illustrates an ADD instruction where ST(2) is added to the top of stack. Referring back to FIG. 8F, ST(2) has a value of D1 and top of stack has a value of D8. Thus, the top of stack now has (D1+D8) and ST(2) remains the same. This is also reflected in the virtual registers 502F accordingly. The FXCH map 504G does not change but physical register "7" does change to (D1+D8) since a new number is entered.

Figure 8H:
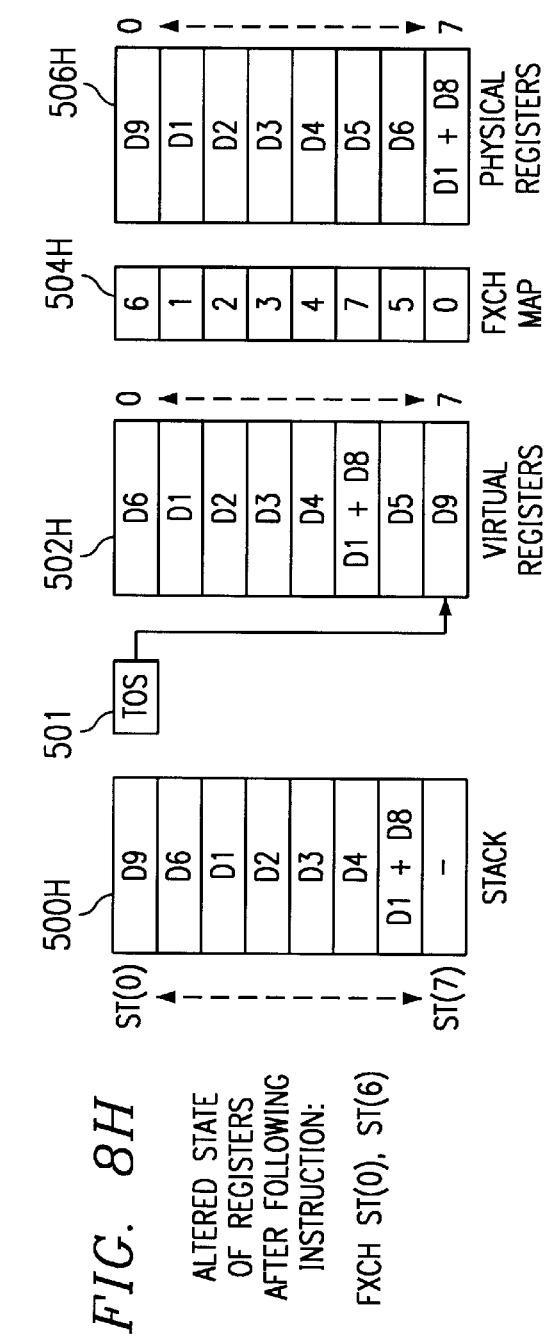

FIG. 8H illustrates another FXCH instruction to exchange the top of stack containing (D1+D8) with ST(6) containing D9 before this instruction (see FIG. 8G). This instruction swaps virtual register "7" which is the top of stack with virtual register "5" which is 6 down from the top of stack. The FXCH map 504H is updated by swapping 0 and 7 while the physical registers remain the same. Thus, any subsequent instruction requiring a floating point register ST(6), for example, would reference the FXCH map 504H which maps virtual register "5" to physical register "7" for the correct operand.

Accordingly, through the present invention, the number of clocks needed for floating point exchange operations has been reduced significantly by using virtual registers and an FXCH map or look-up-table containing three bits, for example, representing eight physical register numbers which are updated. Since the virtual registers (seen by the programmer) are mapped to the physical registers by the FXCH map, actual data bits of the physical registers need not be shuffled around saving time and complex hardware wiring.

It will be apparent to those skilled in the art that various modifications and variations can be made in the floating point operation system of the present invention without departing from the spirit or scope of the invention. For example, the present invention is also applicable to other operations such as integer exchange operations. Thus, it is intended that the present invention cover the modifications and variations of this invention provided they come within the scope of the appended claims and their equivalents.

What is claimed is:

1. A system for processing an instruction including a stack, virtual registers, a stack pointer pointing to one of the virtual registers as top of stack, physical registers, and a reference table mapping the virtual registers to the physical registers, the system comprising:

an instruction unit generating an instruction;

a decode unit receiving the instruction from the instruction unit, the decode unit decoding the instruction and determining a type of instruction including and exchange instruction;

a logic unit coupled to the reference table and the decode unit, the logic unit updating the reference table for each exchange instruction received from the decode unit, the physical registers maintaining the same contents for said each exchange instruction; and a memory to hold more than one copy of the reference table contents to enable multiple outstanding prediction branch instructions.

2. The system according to claim 1, wherein the instruction unit includes:

an instruction cache;

an instruction parser coupled to the cache; and a plurality of parcel registers coupled to the instruction parser and receiving parsed instruction.

3. The system according to claim 1, wherein the instruction includes a floating point instruction and the logic unit refers to the reference table to obtain any operand of the instruction.

4. The system according to claim 1, wherein the instruction includes a floating point exchange instruction.

5. The system according to claim 1, wherein the instruction includes an integer instruction.

6. A system for processing floating point instruction including a stack, virtual registers, a stack pointer pointing to one of the virtual registers as top of stack, physical registers, and a reference table mapping the virtual registers to the physical register, the system comprising:

an instruction unit generating a plurality of instructions;

a decode unit including a plurality of decoders receiving the plurality of instructions from the instruction unit, respectively, the decode unit decoding the plurality of instructions and determining whether any one of the instructions is a floating point instruction including a floating point exchange instruction;

a logic unit coupled to the reference table and including a plurality of logic devices coupled to the plurality of decoders in the decode unit, respectively, the logic unit generating an updated table for each floating point exchange instruction received from the decode unit, the physical registers maintaining the same contents for said each exchange instruction;

a control unit receiving the updated table from the logic unit and updating the reference table with the updated table; and a memory to hold more than one copy of the reference table contents to enable multiple outstanding prediction branch instructions.

7. The system according to claim 6, further comprising a memory coupled to the logic unit and the control unit, the memory updating the reference table with a priority reference table in accordance with a control signal from the control unit.

8. The system according to claim 7, further comprising a multiplexer coupled to the control unit and the memory, the multiplexer updating the reference table with one of the updated table from the logic unit and the priority reference table from the memory in accordance with the control signal from the control unit.

9. The system according to claim 6, wherein the instruction unit includes:
    an instruction cache;
    an instruction parser coupled to the cache; and
    a plurality of parcel registers coupled to the instruction parser and receiving parsed instruction.

10. The system according to claim 6, wherein the logic unit refers to the reference table for floating point instructions other than the floating point exchange instruction.

11. A method for processing an instruction using a stack, virtual registers, a stack pointer pointing to one of the virtual registers as top of stack, physical registers, and a reference table mapping the virtual registers to the physical registers, the method comprising:
    generating an instruction from an instruction unit;
    decoding the instruction and determining whether the instruction is an exchange instruction in a decode unit;
    updating the reference table and maintaining contents of the physical registers without change when the instruction is the exchange instruction; and
    holding more than one copy of the reference table contents in a memory to enable multiple outstanding prediction branch instructions.

12. The method according to claim 11, wherein the step of generating the instruction includes the step of parsing the instruction.

13. The method according to claim 11, further comprising the step of using the reference table to execute floating point instructions.

14. The method according to claim 11, wherein the instruction includes a floating point exchange instruction.

15. The method according to claim 11, wherein the instruction includes an integer instruction.

16. The method according to claim 11, wherein the step of updating the reference table includes the steps of:
    generating an updated table and maintaining contents of the physical registers for each floating point exchange instruction; and
    updating the reference table with the updated table.

17. The method according to claim 11, further comprising the step of updating the reference table with a priority reference table in accordance with a control signal.

18. The method according to claim 17, wherein the step of updating the reference table with the priority reference table includes the steps of:
    determining whether to update the reference table with the updated table or the priority reference table; and
    updating the reference table in accordance with the determining step.

19. A system for implementing a floating point operation using a stack, virtual registers, a stack pointer, physical registers, and a map referencing the virtual registers to the physical registers, the system comprising:
    means for determining whether an instruction is a floating point exchange instruction;
    means for updating the stack, the virtual registers, and the map when the instruction is the floating point exchange instruction while maintaining contents of the physical registers without change; and
    means for holding more than one copy of the reference table contents to enable multiple outstanding prediction branch instructions.

20. The system according to claim 19, further comprising:
    means for determining whether the instruction is a push instruction;
    means for updating the stack, the stack pointer, the virtual registers, and the physical register when the instruction is the push instruction while maintaining contents of the map;
    means for determining whether the instruction is a pop instruction;
    means for updating the stack and the stack pointer when the instruction is the pop instruction while maintaining the contents of the map, the virtual register, and the physical registers;
    means for determining whether the instruction is a floating point register instruction when the instruction is not any one of the floating point exchange instruction, push instruction, and the pop instruction; and
    means for processing the instruction using the map to reference the physical registers when the instruction is the floating point register instruction.

21. A system for processing an instruction including virtual registers, physical registers, and a reference table mapping the virtual registers to the physical registers, the system comprising:
    an instruction unit generating a plurality of instructions;
    a decode unit receiving the plurality of instructions from the instruction unit, the decode unit decoding the instruction and determining whether an instruction swaps contents of two operand registers;
    a logic unit coupled to the reference table and the decode unit, the logic unit updating the reference table for each exchange instruction received from the decode unit, the physical registers maintaining the same contents for said each exchange instruction; and
    a memory to hold more than one copy of the reference table contents to enable multiple outstanding prediction branch instructions.

22. The system according to claim 21, further comprising a stack showing one way to view contents of the physical registers and a stack pointer pointing to one of the virtual registers as top of stack, the virtual registers showing another way to view the contents of the physical registers.

23. The system according to claim 21, wherein the instruction includes a floating point exchange instruction.

24. The system according to claim 22, wherein the instruction includes an integer exchange instruction.

* * * * *